United States Patent
Guinn et al.

(10) Patent No.: US 10,281,108 B2
(45) Date of Patent: May 7, 2019

(54) INTERLOCKING JOINTS FOR INJECTION MOLDED PART

(71) Applicant: Valeo North America, Inc., Troy, MI (US)

(72) Inventors: Brian Guinn, Seymour, IN (US); Thomas Maire, Seymour, IN (US); Pascal Haillant, Seymour, IN (US)

(73) Assignee: Valeo North America, Inc., Troy, MI (US)

(*) Notice: Subject to any disclaimer, the term of this patent is extended or adjusted under 35 U.S.C. 154(b) by 0 days.

(21) Appl. No.: 15/463,710

(22) Filed: Mar. 20, 2017

(65) Prior Publication Data
US 2018/0266650 A1 Sep. 20, 2018

(51) Int. Cl.
| | |
|---|---|
| *F21V 3/06* | (2018.01) |
| *B29C 45/00* | (2006.01) |
| *B29C 65/02* | (2006.01) |
| *B29L 31/00* | (2006.01) |
| *F21S 41/29* | (2018.01) |
| *F21S 45/50* | (2018.01) |
| *F21V 17/10* | (2006.01) |
| *F21V 31/00* | (2006.01) |

(52) U.S. Cl.
CPC ............ *F21S 45/50* (2018.01); *B29C 45/006* (2013.01); *B29C 65/02* (2013.01); *F21S 41/29* (2018.01); *F21V 3/062* (2018.02); *F21V 17/104* (2013.01); *F21V 31/00* (2013.01); *B29L 2031/747* (2013.01)

(58) Field of Classification Search
CPC ........ F21S 45/50; F21S 41/29; F21S 48/1208; F21S 48/33; F21V 3/062; F21V 3/0436; F21V 17/104; F21V 31/00; B29C 45/006; B29C 65/02
USPC .......................................................... 362/376
See application file for complete search history.

(56) References Cited

U.S. PATENT DOCUMENTS

| | | | | |
|---|---|---|---|---|
| 3,213,753 | A * | 10/1965 | Rogers ................. | F21S 41/135 359/489.16 |
| 3,641,967 | A * | 2/1972 | Charbonneaux ....... | G01D 11/28 116/288 |
| 3,847,711 | A * | 11/1974 | Howard .............. | B29C 66/8322 156/515 |
| 5,093,967 | A * | 3/1992 | Frank ................... | A41H 37/001 24/693 |
| 5,878,468 | A * | 3/1999 | Tomic ....................... | B26F 1/08 24/585.1 |
| 6,283,611 | B1 * | 9/2001 | Sharrah .................. | F21L 4/005 362/158 |
| 6,634,487 | B2 | 10/2003 | Ritter et al. | |
| 7,955,543 | B2 * | 6/2011 | Deininger .............. | A61N 1/375 264/279.1 |
| 2001/0030866 | A1 * | 10/2001 | Hochstein ............ | F21V 29/004 362/294 |

(Continued)

*Primary Examiner* — Bryon T Gyllstrom
(74) *Attorney, Agent, or Firm* — Oblon, McClelland, Maier & Neustadt, L.L.P.

(57) ABSTRACT

An apparatus, a lighting apparatus, and a vehicle with an interlocking joint are described. The interlocking joint includes a first part made of a first material including a plurality of grooves, and a second part molded over the plurality of the grooves of the first part creating a mechanical bond and a chemical bond between the first part and the second part.

15 Claims, 6 Drawing Sheets

(56) References Cited

U.S. PATENT DOCUMENTS

| | | | |
|---|---|---|---|
| 2002/0096341 A1* | 7/2002 | Hagan | B25B 21/00 173/170 |
| 2004/0095779 A1* | 5/2004 | Schottland | F21V 3/04 362/510 |
| 2008/0137200 A1* | 6/2008 | Hsu | G02B 5/0215 359/599 |
| 2010/0053976 A1* | 3/2010 | Cornelissen | B29D 11/00596 362/297 |
| 2014/0140037 A1* | 5/2014 | Cho | F21V 9/14 362/19 |

* cited by examiner

INTERLOCKING JOINTS FOR INJECTION MOLDED PART

BACKGROUND

Description of the Related Art

Plastic parts made from resins are commonly manufactured using an injection molding process. A plastic part including two or more sub-parts made from similar or dissimilar materials are manufactured using an overmolding process. The materials can be resins, rubber, thermoplastic elastomers (TPE), or other molding materials.

Overmolding is a type of co-injection method in which two or more materials are injected in to a cast in a same molding cycle. A first material, in a molten state, spreads in the cast while a second material, in molten state, is injected over or into the first material forming the desired plastic part. Some commonly found overmolded parts include lighting fixtures of a vehicle, scissors, cables, tooth brush, cleaning brush, a torch casing, phone casings, etc.

However, the conventional overmolding process creates a butt joint between the sub-parts and the bonding between the first material and the second material may not be strong. Common issues with overmolded components include risk of delamination due to physical and/or chemical forces, leakage, cracking, etc. Thus, an efficient way to assemble the components to create reliable and internally leak proof is necessary.

SUMMARY

According to an embodiment of the present disclosure, there is provided an apparatus with an interlocking joint. The apparatus includes a first part made of a first material including a plurality of grooves, and a second part molded over the plurality of the grooves of the first part creating a mechanical bond and a chemical bond between the first part and the second part. The plurality of grooves is formed on a first side of the interlocking joint forming a single-sided interlocking joint. Also, the plurality of grooves is formed on a second side of the interlocking joint forming a dual-sided interlocking joint. The plurality of grooves is equidistance from each other. The plurality of grooves on the first side is offset from the plurality of grooves on the second side of the dual-sided interlocking joint. The plurality of grooves has a wave-like shape that prevents a fluid from passing through the interlocking joint from the first part to the second part or vice versa.

Conventionally, joining two parts mechanically or chemically may need surface preparation to provide a reliable bonding. However, the interlocking joint according to the present disclosure does not does not require surface preparation or other pre-processing activities before bonding. Thus, the interlocking joint can save time and cost of manufacturing, while creating a more reliable joint.

Further, according to an embodiment of the present disclosure, there is provided a lighting apparatus with an interlocking joint. The lighting apparatus includes a lens made of a first material including a plurality of grooves, and a based molded over the plurality of the grooves of the lens creating a mechanical bond and a chemical bond between the lens and the base. The plurality of grooves is formed on a first side of the interlocking joint forming a single-sided interlocking joint. Also, the plurality of grooves is formed on a second side of the interlocking joint forming a dual-sided interlocking joint. The plurality of grooves is equidistance from each other. The plurality of grooves on the first side is offset from the plurality of grooves on the second side of the dual-sided interlocking joint. The plurality of grooves have a wave-like shape that prevents a fluid from passing through the interlocking joint from the first part to the second part or vice versa.

Further, according to an embodiment of the present disclosure, there is provided a vehicle including a lighting apparatus with an interlocking joint. The lighting apparatus includes a lens made of a first material including a plurality of grooves, and a based molded over the plurality of the grooves of the lens in an integral manner creating a mechanical bond and a chemical bond between the lens and the base. The plurality of grooves is formed on a first side of the interlocking joint forming a single-sided interlocking joint. Also, the plurality of grooves is formed on a second side of the interlocking joint forming a dual-sided interlocking joint. The plurality of grooves is equidistance from each other. The plurality of grooves on the first side is offset from the plurality of grooves on the second side of the dual-sided interlocking joint. The plurality of grooves has a wave-like shape that prevents a fluid from passing through the interlocking joint from the first part to the second part or vice versa.

Further, according to an embodiment of the present disclosure, there is provided a lighting device. The lighting device includes a first part made of a first material including at least one groove, and a second part placed over the at least one groove of the first part, wherein a junction between the first part and the second part included in an interlocking joint to create a mechanical bond and a chemical bond between the first part and the second part. The plurality of grooves is formed on a first side of the junction forming a single-sided interlocking joint. The plurality of grooves is formed on a second side of the junction forming a dual-sided interlocking joint. The plurality of grooves is equidistance from each other. The plurality of grooves on the first side is offset from the plurality of grooves on the second side of the dual-sided interlocking joint. The plurality of grooves has a wave-like shape that prevents a fluid from passing through the junction from the first part to the second part or vice versa.

The foregoing general description of the illustrative implementations and the following detailed description thereof are merely exemplary aspects of the teachings of this disclosure, and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings.

DETAILED DESCRIPTION

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed embodiment(s). However, it will be apparent to those skilled in the art that the disclosed embodiment(s) may be practiced without those specific details. In some instances, well-known structures and components may be shown in block diagram form in order to avoid obscuring the concepts of the disclosed subject matter.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "top," "bottom," "side," "height," "length," "width," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Figure 1:
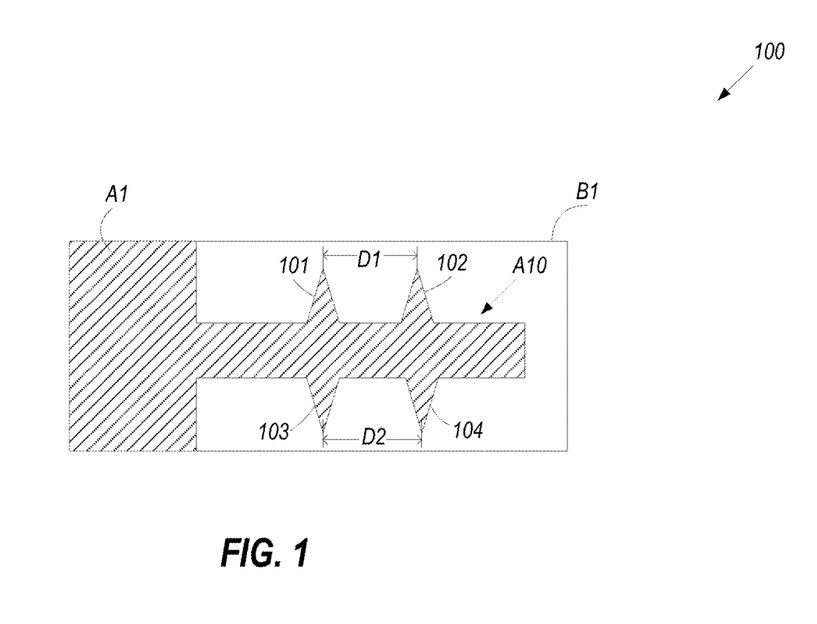
FIG. 1 illustrates a first molded part with a dual-sided symmetric interlocking joint according to an embodiment of the present disclosure.

FIG. 1 illustrates a first molded part 100 with a dual-sided symmetric interlocking joint according to an embodiment of the present disclosure. The first molded part 100 can be formed from two laminates (or parts in general) of different (or similar) material molded together using an over molding process such as an insert molding, two-shot molding, a co-injection molding or a combination thereof. The first molded part 100 includes a first interlocking joint A10 that joins a first laminate A1 and a second laminate B1. The first interlocking joint A10 is a joint between two or more similar (or dissimilar) materials that provide a mechanical as well as chemical bonding between the connected parts formed by overmolding process. The first laminate A1 can be made of a first resin material and the second laminate B1 can be made of second resin material. Alternatively or in addition, the first laminate A1 and the second laminate B1 can both be made of same resin material.

A chemical bond refers to an inter-molecular attraction between the first laminate A1 and the second laminate B1 in a molten state that is most commonly attributed to Van der Waals forces. Strength of the chemical bond depends on compatibility between the two bonding materials. If the bonding materials are not entirely compatible, weak chemical bond is formed which can cause the bonding materials to separate, form a gap at a junction between the bonding materials, leakage paths, etc. As such, an additional non-chemical bonding such as a mechanical bonding is developed in the present disclosure.

A mechanical bond refers to a physical interlock between two laminates (shown in drawings). The mechanical bond can also include an inter-molecular entanglement when a tip of the interlock melts and inter-mix with the material of the second shot.

The first interlocking joint A10 can include a plurality of molded-in grooves such as grooves 101, 102, 103, and 104. The molded-in grooves 101-104 of the first interlocking joint A10 provides different types of bonding—mechanical, chemical and/or intermolecular bonding between the first laminate A1 and the second laminate B1. Such a first interlocking joint A10 can be achieved in a single molding cycle.

The grooves (e.g., grooves 101-104) of the interlocking joint (e.g., A10) can be characterized by a shape and size, an orientation, a location, a distance between consecutive grooves, or other appropriate geometric factors. For example, the grooves 101-104 can be triangular in shape forming an isosceles triangle to allow equi-distribution of forces from a tip to the base of the triangle in a vertical direction and/or horizontal direction. The grooves 101 and 102 can be oriented to point upwards from a top side of the first interlocking joint A10, while the grooves 103 and 104 can be oriented to point downwards from a bottom side of the first interlocking joint A10. Thus, a dual-sided symmetric interlocking joint (referred as the first interlocking joint A10) is formed with grooves 101 and 102 on the top side and the grooves 103 and 104 on the bottom side of the first interlocking joint A10. The grooves 101 (and 102) and 103 (and 104) can be aligned with no offset distance between them. Furthermore, the distance D1 between the grooves 101 and 102, and the distance D2 between the grooves 103 and 104 can be substantially similar. The grooves 101-104 can have similar dimensions such as height or length of the base.

Figure 2:
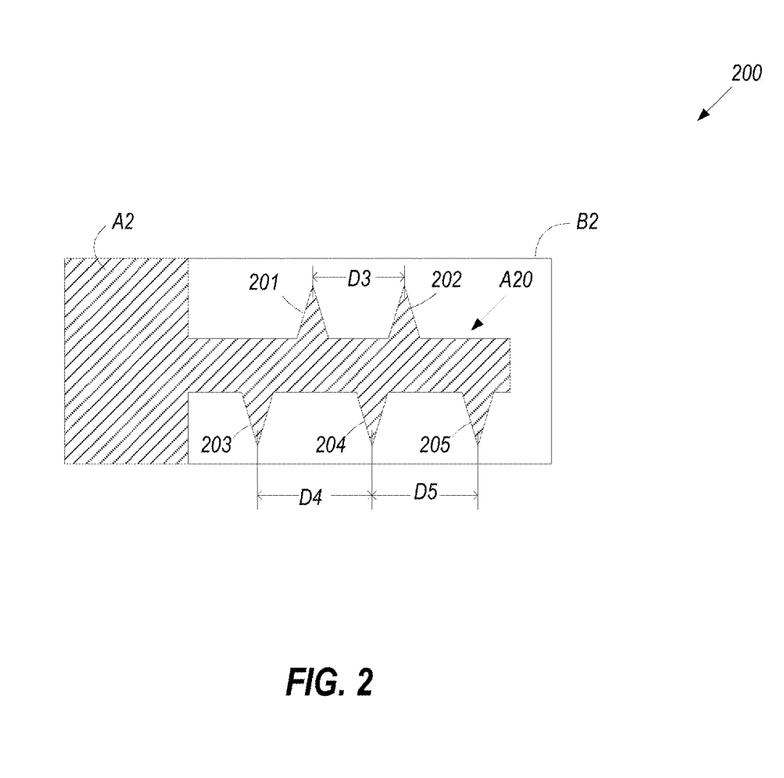
FIG. 2 illustrates a second molded part with a dual-sided asymmetric interlocking joint according to an embodiment of the present disclosure.
Figure 3:
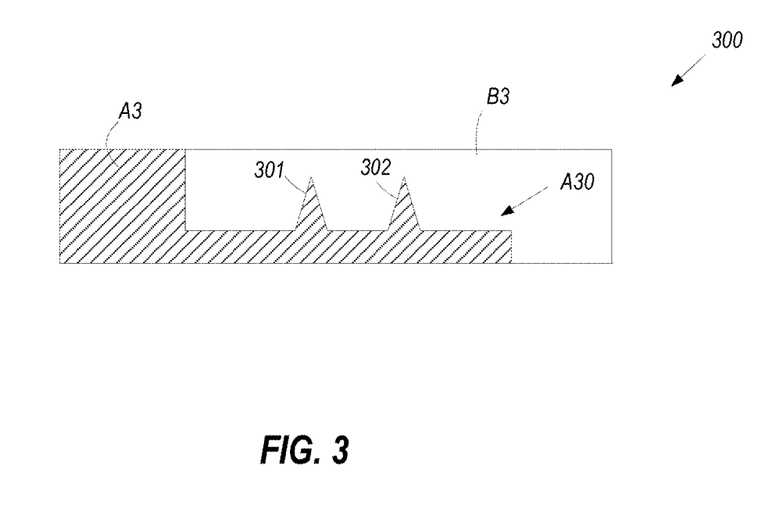
FIG. 3 illustrates a third molded part with a single-sided interlocking joint according to an embodiment of the present disclosure.

The size, shape, geometry, location, and other similar factors related to the molded-in grooves (e.g., grooves 101-104) of the interlocking joint can be tunable. For example, the molded-in grooves can be continuous like a wave, or discontinuous like staggered formation. FIGS. 2 and 3 illustrate exemplary variations of the molded-in grooves.

The aforementioned factors can define the performance of the interlocking joint. The performance of the interlocking joint can be measured in terms of a shear force (in horizontal direction) required to break the interlocking joint, a vertical force required to separate the first part (e.g., A1) from the second part (e.g., B1), reduction in leakage, time required for a fluid to traverse through the interlocking joint from one end to another, etc. As the interlocking joint provides a mechanical joint, the shear force required to separate the parts is greater than for a simple butt joint, commonly observed between welded parts. Also, as the tips of the grooves can melt and chemically bond with the second part B1, the vertical force required to separate the components is high. Also, the chemical and mechanical bond provides a tortuous path making it difficult for a fluid to leak from one end to another. The rate of leak can also be controlled by defining a more complex groove design (e.g., a symmetric vs. an asymmetric design).

FIG. 2 illustrates a second molded part 200 with a dual-sided asymmetric interlocking joint A20 (also referred as a second interlocking joint A20) according to an embodiment of the present disclosure. The second interlocking joint A20 includes odd number of grooves 201-205.

The grooves 201 and 202 can be oriented to point upwards from a top side of the second interlocking joint A20, while the grooves 203, 204 and 205 can be oriented to point downwards from a bottom side of the second interlocking joint A20. Thus, a dual-sided asymmetric interlocking joint (or the second interlocking joint A20) is formed with grooves 201 and 202 on the top side and the grooves 203, 204 and 204 on the bottom side. The grooves 201 (or 202) and 203 (or, 204 and 205) can be offset from each other. Furthermore, the distance D3 between the grooves 201 and 202, and the distance D4 and D5 between the grooves 203, 204 and 105 can be substantially similar. The grooves 201-205 can have similar dimensions such as height or length of the base. Such a second interlocking joint A20 can provide a better performance compared to the first interlocking joint A10.

FIG. 3 illustrates a third molded part 300 with a single-sided interlocking joint A30 (also referred as a third interlocking joint A30) according to an embodiment of the present disclosure. The third interlocking joint A30 includes two grooves 301-302 located only on a top side of the interlocking joint A30. The grooves 301 and 302 can be oriented to point upwards from a top side of the third interlocking joint A30. Such a third interlocking joint A30 can be weaker in performance compared to the first interlocking joint A10 and the second interlocking joint A20, but still stronger than a conventional butt joint.

Conventionally, joining two parts mechanically or chemically may need surface preparation to provide a reliable bonding. However, the first interlocking joint A10 (or A20, A30, etc.) does not does not require surface preparation or other pre-processing activities before bonding. Thus, the first interlocking joint A10 can save time and cost of manufacturing, while creating a more reliable joint.

Figure 4:
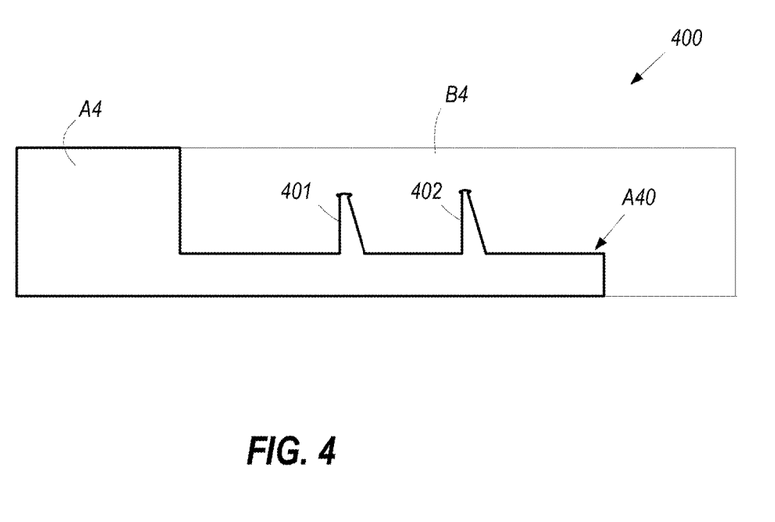
FIG. 4 illustrates a fourth molded part with melted tips of the interlocking joint according to an embodiment of the present disclosure.

The first molded part 100 can be formed by co-injecting injecting a first material and a second material in a molten state into a cast. The first material can be used to form a first laminate A1 having the first interlocking joint A10. The molded-in grooves 101-104 can be created using inserts. The second material can be molded over the first laminate A1 after rotating the part to form a second laminate B1. As the second material interacts with the first interlocking joint A10, the temperature of the second material causes the tips of the grooves 101-104 to melt creating a chemical and/or intermolecular bond along the tips and edges of the grooves 101-104. FIG. 4 illustrates a fourth molded part 400 with melted tips 401 and 402 of a fourth interlocking joint A40. Also, the pressure applied during the overmolding process can assist in creating a seamless bond between the two materials.

Conventionally, a butt joint is used to join two parts of similar or dissimilar material together via injection molding. However, the butt joints are highly susceptible to providing leakage paths for a fluid like water or chemicals to flow through the joint and damage the integrity of the molded component.

On the other hand, the interlocking joint comprising molded-in grooves provide several advantages. The interlocking joint between different materials (similar or dissimilar) reduces or prevents the risk of delamination, leakage, or chemical attack. Additionally, the interlocking joint creates a strong joint between dissimilar materials. Thus, the integrity of the molded components can be reliably maintained under various conditions and applications such as under or in contact with water, sealing purposes, in rain preventing water from travelling to electronics of a lighting apparatus, etc.

Figure 5:
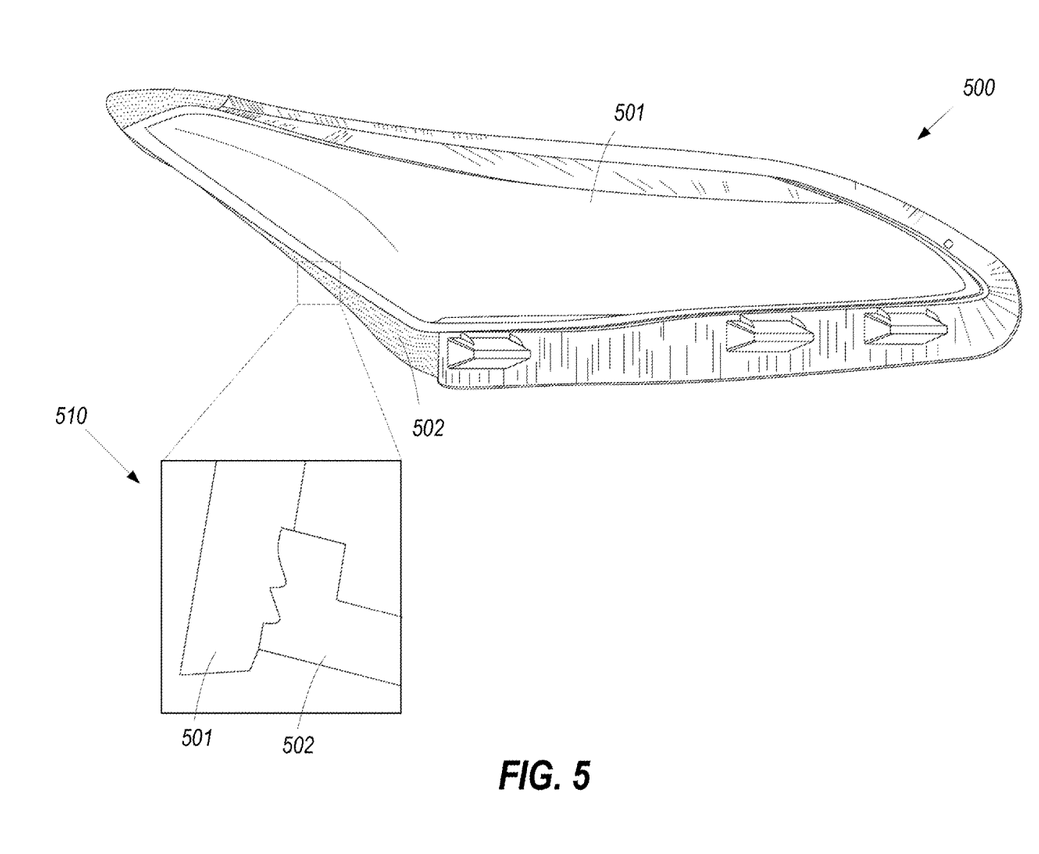
FIG. 5 illustrates a lighting apparatus having an interlocking joint according to an embodiment of the present disclosure.

FIG. 5 illustrates a lighting apparatus 500 having an interlocking joint 510 according to an embodiment of the present disclosure. The lighting apparatus 500 includes a lens 501 on the front side, for example, of a headlight, and a base 502 attached to the lens 501 for support or assembly purposes. The lighting apparatus 500 can be a molded from different materials, for example, the lens 501 can be made of a transparent plastic to allow light to project outside and the base 502 can be transparent, opaque, or made of different colored material. The base 502 can enhance the aesthetic appearance of the headlamps.

The lens 501 and the base 502 can be joined by the interlocking joint 510. The interlocking joint 510 can extend fully or partially along the periphery of the lens 501. The interlocking joint 510 can further include ribs to provide additionally rigidity to the joint. The interlocking joint 510 creates a mechanical as well as chemical bond between the lens 501 and the base 502. As such, the interlocking joint 510 can prevent leakage that can potentially cause short circuit or other electrical damage to the lighting apparatus 500. Also, the interlocking joint 510 can prevent delamination and maintain the integrity of the lighting apparatus 500. The interlocking joint 510 can further maintain integrity under shear forces that may act on the outer surface of the lens 501, for example, during cleaning or restoring the lens 501.

Figure 6:
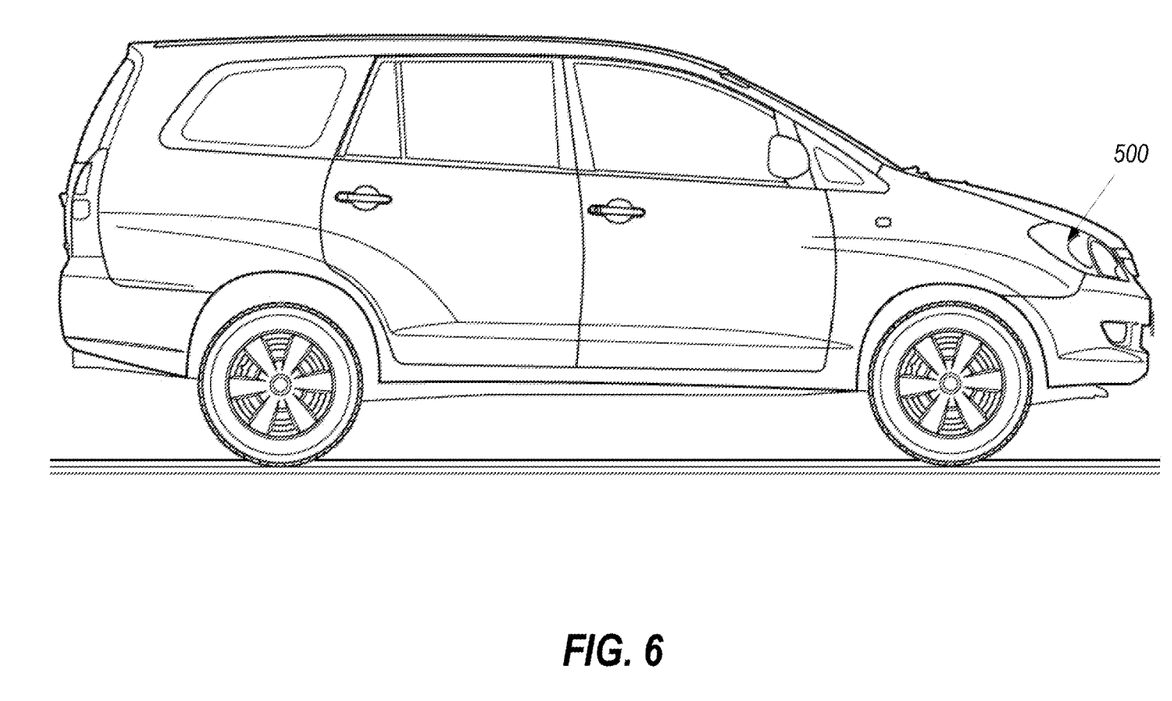
FIG. 6 illustrates an example vehicle fitted with the lighting apparatus according to an exemplary embodiment of the present disclosure.

FIG. 6 illustrates an example vehicle fitted with the lighting apparatus 500 according to an exemplary embodiment of the present disclosure.

While certain embodiments have been described, these embodiments have been presented by way of example only, and are not intended to limit the scope of the present disclosures. Indeed, the apparatus described herein can be embodied in a variety of other forms; furthermore, various omissions, substitutions and changes in the form of the apparatus described herein can be made without departing from the spirit of the present disclosures. The accompanying claims and their equivalents are intended to cover such forms or modifications as would fall within the scope and spirit of the present disclosures.

What is claimed is:

1. An apparatus with an interlocking joint, comprising:
   a first part made of a first material including a plurality of grooves; and
   a second part injection molded to the plurality of the grooves of the first part creating a mechanical bond and a chemical bond between the first part and the second part,
   wherein at least one of the plurality of grooves includes a continuously curved wave shape that prevents a fluid from passing through the interlocking joint from the first part to the second part or vice versa.

2. The apparatus according to claim 1, wherein the plurality of grooves is formed on a first side of the interlocking joint forming a single-sided interlocking joint.

3. The apparatus according to claim 2, wherein the plurality of grooves includes a plurality of grooves that is formed on a second side of the interlocking joint, forming a dual-sided interlocking joint, wherein the dual-sided interlocking joint comprises a protrusion of the first part to the second part, the protrusion including the first and second sides.

4. The apparatus according to claim 3, wherein the plurality of grooves that is formed on at least one of the first and second sides includes grooves that are equidistant from each other.

5. The apparatus according to claim 3, wherein the plurality of grooves on the first side is offset from the plurality of grooves on the second side of the dual-sided interlocking joint.

6. A lighting apparatus with an interlocking joint, comprising:
a lens made of a first material including a plurality of grooves; and
a base injection molded to the plurality of the grooves of the lens in an integral manner creating a mechanical bond and a chemical bond between the lens and the base,
wherein at least one of the plurality of grooves includes a continuously curved wave shape that prevents a fluid from passing through the interlocking joint from the lens to the base or vice versa.

7. The lighting apparatus according to claim 6, wherein the plurality of grooves is formed on a first side of the interlocking joint forming a single-sided interlocking joint.

8. The lighting apparatus according to claim 7, wherein the plurality of grooves includes a plurality of grooves that is formed on a second side of the interlocking joint, forming a dual-sided interlocking joint, wherein the dual-sided interlocking joint comprises a protrusion of the lens into the base, the protrusion including the first and second sides.

9. The lighting apparatus according to claim 8, wherein the plurality of grooves that is formed on at least one of the first and second sides includes grooves that are equidistant from each other.

10. The lighting apparatus according to claim 8, wherein the plurality of grooves on the first side is offset from the plurality of grooves on the second side of the dual-sided interlocking joint.

11. A lighting device comprising:
a first part made of a first material including at least one groove; and
a second part injection molded to the at least one groove of the first part,
wherein a junction between the first part and the second part includes an interlocking joint to create a mechanical bond and a chemical bond between the first part and the second part,
wherein at least one of the at least one groove includes a continuously curved wave shape that prevents a fluid from passing through the interlocking joint from the first part to the second part or vice versa.

12. The lighting device according to claim 11, wherein the at least one groove includes a plurality of grooves formed on a first side of the junction forming a single-sided interlocking joint.

13. The lighting device according to claim 12, wherein the at least one groove includes a plurality of grooves formed on a second side of the junction, forming a dual-sided interlocking joint, wherein the junction comprises a protrusion of the first part into the second part, the protrusion including the first and second sides.

14. The lighting device according to claim 13, wherein the plurality of grooves that is formed on the first and second sides includes grooves that are equidistant from each other.

15. The lighting device according to claim 13, wherein the plurality of grooves on the first side is offset from the plurality of grooves on the second side of the dual-sided interlocking joint.

* * * * *